US006746609B2

(12) United States Patent
Stander

(10) Patent No.: US 6,746,609 B2
(45) Date of Patent: Jun. 8, 2004

(54) COOLING TOWER WATER TREATMENT

(76) Inventor: Berile B. Stander, 11076 Fleetwood St., Sun Valley, CA (US) 91352

( * ) Notice: Subject to any disclaimer, the term of this patent is extended or adjusted under 35 U.S.C. 154(b) by 106 days.

(21) Appl. No.: 10/224,362

(22) Filed: Aug. 21, 2002

(65) Prior Publication Data
US 2004/0035795 A1 Feb. 26, 2004

(51) Int. Cl.⁷ .................................................. C02F 9/00
(52) U.S. Cl. ........................ 210/662; 210/668; 210/743; 210/765
(58) Field of Search ................................ 210/660, 662, 210/668, 743, 765

(56) References Cited

U.S. PATENT DOCUMENTS

| 2,807,582 A | 9/1957 | Applebaum | 210/664 |
| 3,805,880 A | 4/1974 | Lawlar | 165/60 |
| 4,532,045 A | 7/1985 | Littmann | 210/668 |
| 4,917,806 A | * | 4/1990 | Matsunaga et al. | 210/662 |
| 4,931,187 A | 6/1990 | Derham et al. | 210/662 |
| 5,145,585 A | 9/1992 | Coke | 210/695 |
| 5,730,879 A | 3/1998 | Wilding et al. | 210/662 |
| 5,985,152 A | * | 11/1999 | Otaka et al. | 210/668 |

* cited by examiner

Primary Examiner—Robert A. Hopkins
(74) Attorney, Agent, or Firm—Edgar W. Averill, Jr.

(57) ABSTRACT

A process for treating cooling tower water in a system which includes a recirculated evaporative cooling water stream and a source of make-up water. A side stream is taken off of the source of make-up water and the side stream is directed to either a strong acid cation exchange resin unit and/or to a weak acid cation exchange resin unit, after which it is returned to the make-up water line. The pH of saturation is determined for the recirculated evaporative cooling water as is the pH. Depending upon the difference between the pH and the pH of saturation, the side stream of the make-up water is opened or closed and directed to one or both of the cation exchange units.

2 Claims, 1 Drawing Sheet

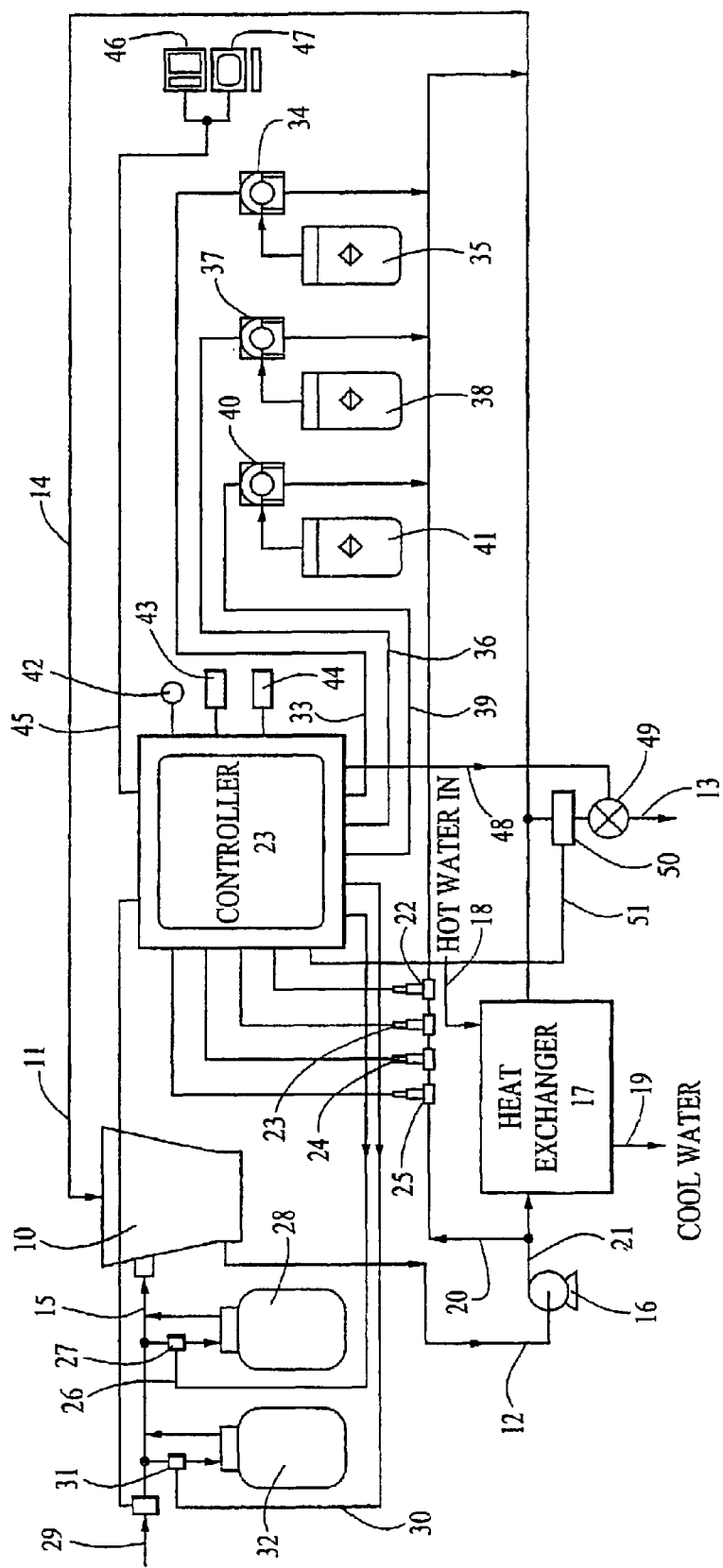

COOLING TOWER WATER TREATMENT

BACKGROUND OF THE INVENTION

The field of the invention is water treatment and the invention relates more particularly to the treatment of water used in evaporative recirculating cooling systems.

One such method is the chemical treatment program which relies on the use of sequestrants and inhibitors for both scale and corrosion control. The system is simple in that it may be controlled by adding the products directly from a container to the cooling water and the system is capable of maintaining a reasonable amount of control over scale and corrosion. However, in order to properly control the system, an increasing volume of water must be bled from the system to keep dissolved salts within their ranges of solubility, thus preventing scale formation. This requires large additions of make-up water to keep the concentration cycles within a scale-free range.

The second commonly used system is one in which the pH and alkalinity of the cooling water are controlled through the addition of pH adjusting chemicals. This type of system has the advantage of permitting somewhat higher concentrations of dissolved salts to build up in the cooling water, thus allowing greater "cycles of concentration." This results in considerable savings of water as less make-up water is required as compared to the polymer treatment program. The chemical additions are capable of scale and corrosion prevention. This maintains cleaner and more efficient heat transfer surfaces.

An improved system is shown in U.S. Pat. No. 5,730,879 of which applicant is a co-inventor. This process utilized a strong cation exchange unit which operated on a side stream of the recirculated evaporative cooling water stream. While this system was generally satisfactory, it raised a problem when regeneration of the strong cation exchange resin was necessary. This problem related to the disposal of the regeneration solution since the resin may have picked up toxic chemicals from the recirculated evaporative cooling water stream. Thus, the cost of regenerating the units became expensive and difficult.

Evaporative cooling systems, of which cooling towers are one example, operate on the principle that the latent heat of vaporization of the water being evaporated removes energy from the system, thus, reducing the temperature of the remaining water in the system only some of the water is evaporated, and the salts in the remaining water are concentrated. This results in increasing the amount of dissolved solids in the recirculating stream. The most common dissolved salts in domestic water are bicarbonates, chlorides, and sulfates of calcium, magnesium, and sodium. When a water containing calcium bicarbonate is heated, as in cooling of air conditioning systems, or other equipment, the heat will strip off one molecule of carbon dioxide, converting the remaining calcium salt to calcium carbonate (limestone) according to the equation:

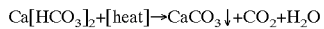

$$Ca[HCO_3]_2 + [heat] \rightarrow CaCO_3 \downarrow + CO_2 + H_2O$$

Unlike most salts, calcium carbonate is less soluble in hot water than in cold water. As a result, scale (calcium carbonate scale) is deposited on heat exchange surfaces. Calcium carbonate solubility is also a function of the pH of the water. Calcium salts are markedly less soluble in high pH systems. Knowing these properties of dissolved solids in cooling waters thus offers several means of control. Controlling the pH will allow more calcium to remain in solution, thus preventing it from becoming a hard scale on a heat exchange surface, or perhaps better still, if one were to eliminate calcium and magnesium from the system entirely, or at least drastically reduce them, the same control could be exercised. This has, in fact, been done through the provision of a water softener to soften the cooling water (i.e. remove the hardness causing ions, calcium and magnesium). While this effectively controls scale, it does not necessarily eliminate the need for acid feed to control pH. The water softening approach also requires extremely large equipment to soften water and is, thus, impractical. Furthermore, softened waters tend to be more corrosive than unsoftened ones. Thus, in these systems, the scaling problem may have been eliminated but at the expense of increased corrosion due to increased salts.

Several patents discuss various approaches to treating make-up water, including U.S. Pat. Nos. 2,807,582; 3,805,880; 4,532,045; 4,931,187; and 5,145,585.

In order to be practical on a wide scale, a water treatment system must be simple and capable of use by plant personnel.

BRIEF SUMMARY OF THE INVENTION

It is an object of the present invention to provide a cooling water treatment process capable of maintaining absolute scale and corrosion free heat transfer surfaces and of reducing water consumption while also eliminating difficulties in regenerating resins used with the process.

The present invention is for a process for conditioning recirculating evaporative cooling water and/or make-up water which includes the steps of determining the pH of saturation. Also, the pH of the recirculated evaporative cooling water stream is measured and its difference from that of the pH of saturation is determined. Based upon this difference, a side stream of the source of make-up water is diverted into either a weak cation exchange resin or a strong cation exchange resin, or a combination of both, and returned to the make-up water.

BRIEF DESCRIPTION OF THE DRAWINGS

The drawing is a diagrammatic view of the process for treating cooling tower water of the present invention.

DESCRIPTION OF THE PREFERRED EMBODIMENTS

A cooling tower 10 has a feed stream 11 of hot water and an exit stream 12 of cool water. Feed stream 11 and exit stream 12 are part of what is basically a loop of recirculated evaporative cooling water 14.

Exit stream 12, after leaving cooling tower 10, passes through pump 16 into heat exchanger 17. There it provides the cooling required for whatever process is in need of cooling. Heat exchanger 1 has a hot water inlet line 18 and a cool water outlet line 19.

A side stream 20 is taken from exit line 21 of pump 16. Various measurements are made from side stream 20 and as the result of the measurement, various treatments are added to side stream 20 before it returns to the recirculated evaporative cooling water stream 14.

More specifically, a conductivity/temperature sensor 22 is fed into controller 23. The controller offers real time information used in calculating the pH of saturation which is the basis of all calcium carbonate saturation based corrosion indices, such as the Langelier, Ryznar and aggressiveness indices. One type of controller which has been successfully used is sold under the trademark "Chemtrol CT-3000" manufactured by Santa Barbara Control Systems. This controller calculates the pH of saturation which is the basis for all calcium carbonate saturation based corrosion indices, such as the Langelier, Ryznar and aggressiveness indices. A flow switch 23 controls the flow through side stream 20 and is also operated by controller 23. A pH sensor 24 is connected to controller 23. Optionally, an oxidation reduction potential measuring unit 25 provides further input to controller 23.

Controller 23 has an output line 26, the output of which operates control valve 27. Control valve 27 controls the flow of a water from the city water input 29 into either the strong or weak cation exchange resin unit 28 and/or 32. The strong acid cation unit removes both mono and divalent cations, which prevents these cations from entering the recirculated evaporative cooling water stream 14. Output line 30 from controller 23 operates control valve 31 which causes a side stream of city water 29 to flow into weak acid cation exchange resin unit 32. Unit 32 removes divalent ions, such as calcium and magnesium.

Placing the exchange units 28 and 32 in a location where they are fed only city water eliminates the problem of contamination of the resin in these units. It also greatly reduces the amount of bleed-off required, since a significant amount of calcium, magnesium, and other cations are removed before they get into the system to build up in the recirculating cooling water 14.

Controller 23 also operates the feeders for additives to prevent corrosion and microbiofouling. Output line 33 operates controller 34, which when activated feeds a corrosion inhibitor fed from supply reservoir 35. Similarly, output line 36 operates controller 37 to selectively feed a biocide from biocide reservoir 38. Output line 39 operates controller 40 which can feed other additives held in reservoir 41.

Other outputs, such as an alarm 42, a data logging output 43, and multiplexing unit 44, also exit controller 23. A remote output control line 45 can be connected to a computer 46 with an associated monitor 47 to permit control of the operation from a remote location.

The amount of bleed-off required is an important feature of the present invention. Since a certain amount of objectionable cations enter the system through line 29, and since they tend to build up as the water is evaporated, a certain amount of bleed-off is necessary. The amount of bleed-off is greatly reduced because of the presence of exchange units 28 and 32. When the level of cations reaches a predetermined amount set in controller 23, control line 48 opens control valve 49, which permits the escape of water through bleed-off line 13. A flow meter 50 provides a measurement of the volume of bleed-off water, which is sent to controller 23 through line 51.

The system of the present invention can operate utilizing the strong acid cation exchange unit by itself. Conversely, it can use the weak acid cation exchange unit 32 by itself, or preferably, can use a combination of both, depending on the condition of the recirculating water.

Shown below is a chart of water and energy saving utilizing the process of the present invention.

| No. of Concentration Cycles | Bleedoff gpm | Bleedoff gpy | Annual Sewer Fee, $** | Bleedoff in Billing Units (100 ft$^3$) | Cost of Water & Sewer, $4.00/BU* | Annual Total for Water & Sewer, $ | Annual Savings over 3 Cycles |
|---|---|---|---|---|---|---|---|
| 3 | 3,800 | 2,000,000 | 910.0 | 2673 | 10,692 | 11,602 | — |
| 5 | 1,900 | 1,000,000 | 405.0 | 1337 | 5,348 | 5,753 | 5,849 |
| 7 | 1,520 | 800,000 | 324.0 | 1097 | 4,278 | 4,602 | 7,000 |
| 10 | 0.950 | 500,000 | 202.5 | 668 | 2,672 | 2,874 | 8,728 |
| 15 | 0.540 | 284,000 | 115.0 | 380 | 1,520 | 1,635 | 9,967 |
| 20 | 0.500 | 262,000 | 106.0 | 350 | 1,400 | 1,506 | 10,096 |

**Based on Los Angeles County Sanitation District charges.
* Water/Sewer charges based on average LADWP rates The process of the present invention also contemplates the addition of acid to the system when pH reduction is needed and the tower is at its hydraulic limit. Using the make-up water line 15 could cause tower overflow and, thus, acid can be added to the recirculating evaporative cooling water line 14 to reduce pH with a minimal increase in water volume. A filter may also be used in systems where windblown and water source contamination give rise to suspended solids.

The net result is a highly efficient and readily regenerative system for treating cooling tower water.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A process for treating cooling tower water in a system which includes a recirculated evaporative cooling water stream, a source of make-up water, an evaporative cooling unit, a heat exchanger, and a bleed-off line, said process comprising:

determining the pH of saturation of the recirculated evaporative cooling water stream;

determining the pH of the recirculated evaporative cooling water stream;

determining the difference between the pH of saturation and the pH and, based upon said difference selectively directing a side stream of said source of make-up through at least one of a unit containing a strong acid cation exchange resin and a unit containing a weak acid cation exchange resin to control the pH of the recirculated evaporative cooling water system within a predetermined range of the pH of saturation;

monitoring the corrosion potential to provide a measurement which determines an amount of corrosion inhibitor to be added; and adding a corrosion inhibitor to said recirculated evaporative cooling water stream in response to the measurement obtained by monitoring the corrosion potential.

2. The process of claim 1 wherein said difference in pH is controlled within a range of 0.4 above or below the pH of saturation.

* * * * *